United States Patent [19]

Andrus

[11] 4,261,510
[45] Apr. 14, 1981

[54] VEHICLE WHEEL TRACTION DEVICE

[76] Inventor: Kermit W. Andrus, 2 Windward Point, Lakewood, N.Y. 14750

[21] Appl. No.: 71,688

[22] Filed: Aug. 31, 1979

[51] Int. Cl.³ .............................................. E01B 23/00
[52] U.S. Cl. ...................................................... 238/14
[58] Field of Search ....................... 238/14; D12/154; 152/208, 213 R, 223–230

[56] References Cited

U.S. PATENT DOCUMENTS

| | | | |
|---|---|---|---|
| 1,193,139 | 8/1916 | Harden | 238/14 |
| 1,324,291 | 12/1919 | Austen | 238/14 |
| 3,025,002 | 3/1962 | Kunz | 238/14 |
| 3,096,939 | 7/1963 | Kalfen | 238/14 |
| 3,289,939 | 12/1966 | Martinov | 238/14 |
| 3,701,474 | 10/1972 | Welz | 238/14 |
| 3,998,981 | 12/1976 | Burkhardt et al. | 238/14 X |
| 4,159,731 | 7/1979 | Dyrdahl | 152/225 R X |

*Primary Examiner*—Randolph A. Reese
*Attorney, Agent, or Firm*—Harvey B. Jacobson

[57] ABSTRACT

A device is disclosed for improving the traction of vehicle wheels, particularly for use with an automotive vehicle rendered immobile in snow or sand. A plate is provided with transverse T-shaped gripping members affixed to the plate on each surface for the entire width of the plate. Accordingly, positive traction is provided to both the vehicle wheel and the soft or slippery material, such as snow, sand, mud, or ice in which the wheel has become embedded. The invention is easily handled and used, particularly in emergency situations, and is durable under repeated conditions of hard use. Each T-shaped transverse bar constituting the gripping means is mounted preferably at an angle of about 25° for presenting a positive gripping surface to enable the wheel to travel along the length of the traction device. Furthermore, the transverse bars provide rigidity to the device and are constructed to avoid damage to the tire. The device can be made of any suitable material, such as a lightweight aluminum alloy, high strength molded plastic, and like materials or combinations of materials.

3 Claims, 4 Drawing Figures

VEHICLE WHEEL TRACTION DEVICE

BACKGROUND OF THE INVENTION

1. Field of the Invention

The invention relates to traction devices. More particularly, the invention provides a traction plate adapted especially for use when the driving wheels of a motor vehicle become embedded in soft or slippery materials, such as snow, mud or sand. The device includes gripping means on both sides in order to enable the wheel to grip the traction device, and at the same time to provide a secure gripping surface on the traction device against the soft material, such as mud, sand or snow, in which the wheel is embedded.

2. Disclosure Statement

In U.S. Pat. No. 3,096,939, issued July 9, 1963 to Kalfen, a traction plate is disclosed for use in snow, mud or ice to afford traction to the wheel of a vehicle, where the plate has rectangular projections or tongues facing outwardly. However, the projections are presented perpendicularly, and accordingly do not offer sufficient traction to be useful for many possible road and weather conditions, and the projections of Kalfen do not extend completely across the width of the device, thereby obviating a strengthening function and reducing the effectiveness of the projections in gripping both the wheel and the soft surface. In U.S. Pat. No. 1,344,238, patented July 22, 1920 by William Lavallee, an articulated safety driver is disclosed for helping to lift a rear wheel embedded in sand, where the device has spurs extending downwardly into the sand, and has transverse ribs on which the wheel rides.

Other patents which may be pertinent to the field of invention include the following:

| 1,335,546 | C.J. Bardon | March 30, 1920 |
| 1,339,612 | J.W. Wilkins | May 11, 1920 |
| 2,496,119 | F. Cesen | Jan. 31, 1950 |
| 2,619,289 | H. Plante | Nov. 25, 1952 |

All of the disclosures of the patents enumerated above suffer the disadvantage of relatively poor traction when an attempt is made to use the devices to remove a vehicle wheel embedded in a soft material, inasmuch as none discloses ribbing angled to grip the wheel on the upper side and similarly angled to embed from the lower side of the device in the soft material.

SUMMARY OF THE INVENTION

The invention provides a vehicle wheel traction device comprising an elongated plate, most conveniently of a width somewhat greater than the width of the vehicle tire with which the invention is contemplated to be used. Securely fastened transversely and in spaced relationship along the length of the plate are a plurality of bars constituting a gripping surface for the wheel, and a plurality of similarly shaped but oppositely oriented bars on the reverse side of the plate for gripping the soft material simultaneously as the wheel is driven along the traction device over the soft material from which the embedded wheel is to be dislodged. Preferably, when made of metal the transverse bars are T-shaped, a surface of which presents an angle of about 25° to the perpendicular extending from the plate. Alternatively, in another embodiment, high strength plastic can be used as the material of construction.

Accordingly, an object of the invention is to provide a traction device suitable for dislodging a vehicle wheel embedded in soft material, such as snow, mud, sand or the like.

Another object is to provide traction devices usable in pairs to assist in dislodging a pair of driving wheels of a vehicle over such soft material.

Still another object is to provide a traction device having transverse traction bars extending the entire transverse width of the elongated plate, in order to impart strength and durability to the traction device.

A further object is to enhance the gripping action resulting from the transverse bar extending the entire transverse width of the plate, both on the wheel side and on the underlying material side.

Another further object is to provide a wheel traction device from materials which are durable, lightweight, conveniently storable in vehicle storage compartments, and which can be economically manufactured with minimum tooling, and which need no assembly for use by the consumer.

These, together with other objects and advantages which will become subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

In many regions where moderate or heavy snowfall creates hazardous driving conditions in colder seasons, the likelihood exists that vehicles such as automobiles will encounter situations where the driving wheels become embedded in snow or mud and the traction required for moving the vehicle will be greater than can be developed on the slippery surface, with the result that one or both of the drive wheels will slip and the vehicle will stall. In other regions of the country, road shoulders frequently comprise loose sand or mud, and a vehicle having both drive wheels embedded therein can experience the same difficulty. In such a situation, it can be important to a stranded motorist to have available means for enabling the immobilized vehicle to reach a hard-surface roadway or to acheive the momentum necessary to proceed. Such a traction device should be storable and lightweight for stowing in a storage area of the vehicle until needed, and for easy and effective use in an emergency situation where and when the need arises.

Figure 1:
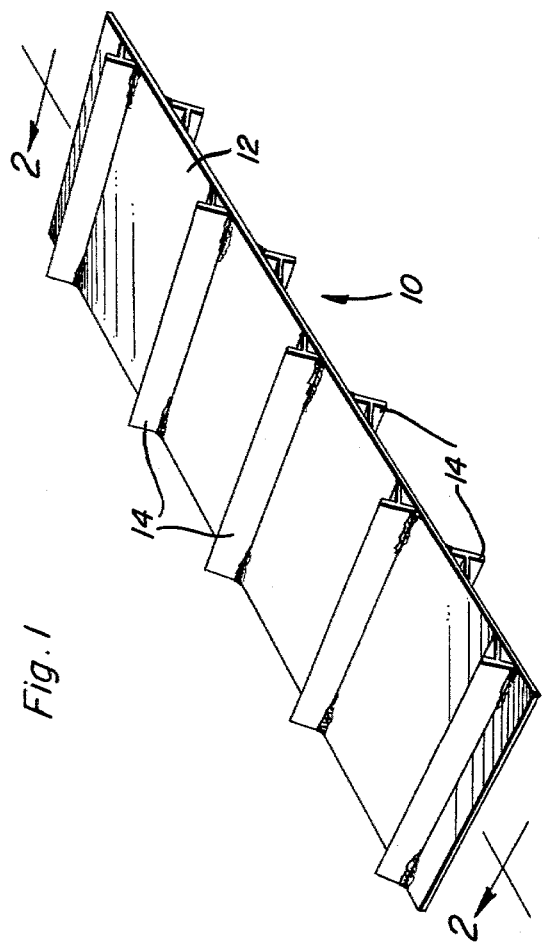
FIG. 1 is a perspective view of a first embodiment of the vehicle wheel traction device of the present invention.

In FIG. 1, traction device 10 consists of elongated plate 12 and a plurality of transverse traction bars 14. Bars 14 are located on both the upper surface 16 of plate 12 and the lower surface 18 of plate 12, upper surface 16 and associated traction bars 14 being adapted for gripping the surface of a tire and lower surface 18 with associated traction bars 14 being adapted for placement on a soft surface, such as snow or sand. As the wheel begins to ride over traction bars 14, thereby establishing a secure grip on traction device 10, the traction bars 14 on the lower surface 18 undertake a digging action into the soft material under the weight of the vehicle transmitted by the wheel. When the device is inserted forward of the driving wheel, the wheel then rides over the traction device without skidding backwardly of the device or rearward movement of the traction device, since the device digs into the soft or slippery material.

Transverse bars 14, which are T-shaped and are either of integral or unitary construction, consist of support member 20 and gripping beam 22, connected to member 20 along joint 24. Beam 22 is attached to the upper surface 16 of plate 12 at beam weldment 26, and support member 20 is joined to upper surface 16 of plate 12 at member weldment 28. Weldments 26 and 28 are conventional, the nature of which will depend upon the materials of constructions used. For example, when plate 12 and transverse bar 14 is metal, a conventional metal-metal weld can be formed. When either or both of transverse bar 14 and plate 12 consists of non-metallic construction, however, a conventional adhesive, such as an epoxy resin adhesive can be used to form weldments 26 and 28 or heat sealing or other securing process can be used if a sufficiently strong and durable joinder of bar 14 to plate 12 is achievable thereby.

Figure 2:
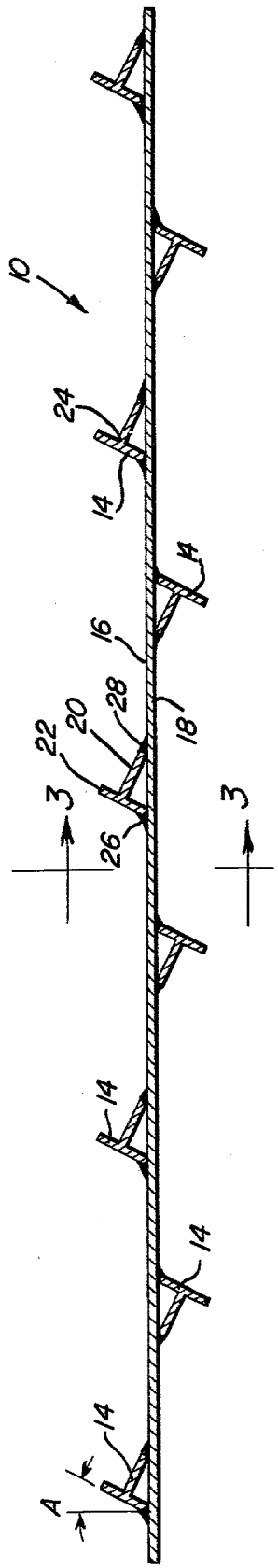
FIG. 2 is a longitudinal sectional view of the device, taken substantially upon a plane passing along section line 2—2 on FIG. 1.

The widths of beam 22 and member 20 are selected so that dihedral angle A has a uniform value for various bars 14, angle A being defined in the leftward portion of FIG. 2 as the angle formed by the surface of gripping beam 22 with respect to a plane perpendicular to plate 12. The preferred value of angle A is about 25°. This angle, which characterizes the transverse bars 14 attached on lower surface 18, as well as those on upper surface 16, enables device 10 in use to effectively engage snow or sand, while enabling the wheel on upper surface 16 to ride up, and thereby provide positive traction in dislodging and freeing a stuck wheel.

Figure 3:
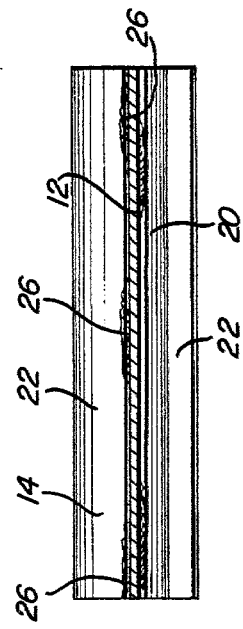
FIG. 3 is a transverse vertical sectional view of the device, taken substantially upon a plane passing along section line 3—3 on FIG. 2.

While the invention is intended to encompass a wide variety of dimensional sizes and angular shapes, for purposes of describing a working example of the invention, the following dimensional parameters are given for illustrative purposes. When constructed of $\frac{1}{8}$-inch thick aluminum alloy in a typical device 10, beam 22 is $\frac{3}{4}$-inch in width, and support member 20 is $\frac{5}{8}$-inch in width and centered on beam 22 perpendicularly. When mounted as shown in FIG. 2, angle A for a device with such relative dimensions has a calculated value of about $26\frac{1}{2}°$. Preferably, three welds are applied to form weldment 26 and weldment 28, with a weld near each end of transverse bar 14 and a weld in the center, as best seen in FIG. 3. Preferably, five transverse bars 14 are welded to upper surface 16 of plate 12, and four transverse bars 14 are attached to lower surface 18 of plate 12, with the transverse bars on lower surface 18 staggered from the positions of transverse bars on upper surface 16. When in use, a wheel tire will ride on the uppermost edges of transverse bars 14 on upper surface 16, urging the upper surface 16 rightwardly and forcing gripping beams 22 of transverse bars 14 attached to lower surface 18 in a pushing action rightwardly against the soft material, such as snow or sand, on which device 10 is placed. Accordingly, the forces transmitted to plate 12 tend to be directed along the direction of support members 20, and the forces directed from plate 12 into the underlying materials also are directed generally along the direction of support members 20 of transverse bars 14 on lower surface 18. It is important that support members 20 of transverse bars on the upper surface 16, as well as on the lower surface 28 form planes parallel to each other, inasmuch as these planes correspond substantially to the direction in which forces are exerted on and through plate 12. Planes forming a dihedral angle of about 25° to about 27° correspond to the directions of force typically encountered in snow, sand or similar environments for the purpose of securing traction with the device of the class described. A typical width of plate 12 and transverse bars 14 is 7 inches, and a useful length for plate 12 is about 22 inches. Further, to facilitate use of the invention, plate 12 bears a marking "top", as well as an arrow indicating the direction to be inserted under a wheel, and can also bear markings indicating the end of plate 12 to be inserted under the wheel. Preferably, the end of device 10 to be inserted under the wheel is the end which presents the planar surface of transverse bars 14 away from the wheel on first contact, or the rightward end of the device in FIG. 2 to a wheel approaching from the right. Device 10 will typically be manufactured and sold in pairs in order to accommodate situations in which both wheels must be given artificial traction, such as a circumstance in which a vehicle performs a maneuver resulting in both driving wheels falling into a depression, ditch, or sand along a roadway.

Figure 4:
FIG. 4 is a fragmentary transverse sectional view of an alternative form of the invention constructed of a synthetic resin or plastic material.

Although the invention has been described for exemplary purposes as manufactured of light aluminum alloy, which provides both strength and ease of handling while giving a durable construction which will withstand many years of hard use, the invention can alternatively be constructed of high strength molded plastic as shown in FIG. 4 in fragmentary section. When transverse bar 30 is made plastic, the space under the transverse bar is preferably solid material, as illustrated in FIG. 4.

With the construction of either the metal or plastic embodiments, few or no areas are available to retain mud, sand, snow or the like. Inefficiency of operation due to clogging is thereby minimized or eliminated, and the traction device 10 can be returned to the trunk or other storage compartment of the vehicle generally free of substantial accumulations of foreign matter.

As will be noted from FIGS. 2 and 4, the spacing of transverse ribs and their location on the upper surface and lower surface of the plate are matched to take greatest advantage of opposing forces exerted on the plate. As the vehicle wheel grips the first rib, and rides over it, an immediate reactive thrust is generated from the opposite direction. The approximately 25°-27° dihedral angle of the transverse ribs is an important feature of the invention, in that most wheels are somewhat embedded in the soft material in which the wheel is stuck, and the 25° angle of the ribs on device 10 placed under the wheel provides for a more positive gripping surface, due to the usual circumstance that the wheel must climb upwardly at an angle out of the snow, mud, sand or like soft material.

The T-shape of the bar of FIG. 2 helps the vehicle tire ride up and over the edge of the top portion of transverse bar 14 associated with upper surface 16, while the transverse bars 14 associated with lower surface 18 always present a flat face into the mud, sand or snow.

While the 22-inch by 7-inch dimensions for plate 12 have been specified in the form of an example, this is to be understood as particularly suitable for standard automobiles. However, different sizes more appropriate for trucks and for recreational vehicles are contemplated as within the scope of the invention. Whether used with automotive vehicles, trucks or recreational vehicles, the device 10 exhibits no substantially tendency to slide under a spinning wheel and behind the vehicle for ineffective traction. Inasmuch as transverse ribs 16 extend entirely across plate 12 on both the upper surface and lower surface, full advantage taken of the opposing forces as described above. Possible damage to a vehicle tire is avoided with the construction of the present invention, which avoids sharp edges or points which could harm a pneumatic vehicle tire. Further, the height of transverse ribs 16 can be chosen to be compatible with tires having the tread depth required by most state vehicle statutes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A portable vehicle wheel traction device for assisting in transporting a vehicle over a soft or slippery surface, comprising a flat elongated plate and gripping means attached to the upper surface and the lower surface of the plate, the gripping means being for providing positive traction between the vehicle wheel and the plate and for embedding the plate through its lower surface in the soft or slippery material, the gripping means comprising a plurality of transverse ribs attached to the upper surface of the plate and to the lower surface of the plate, said transverse ribs comprising T-shaped ribs extending the entire transverse width of the plate, the T-shaped ribs having three edges and being attached to the plate at two of said edges along the transverse width of the plate, each of said transverse ribs comprising a support member and a gripping beam, the support member being attached centrally and perpendicularly to the gripping beam, so that the three edges of each rib consist of two edges formed by the gripping beam, wherein one edge of the gripping beam is positioned above the location the support member is centrally attached to the gripping beam and the other edge of the gripping beam is attached to said plate, the third edge is formed by the support member and is attached to said plate, the gripping beams of the transverse ribs defining planes parallel to each other, each plane defining a uniform dihedral angle with respect to the plate, said dihedral angle being about 25° to about 27°, whereby the wheel is enabled to climb upwardly and outwardly from the soft or slippery material with positive traction between the wheel and the device and with positive traction between the device and the soft or slippery material.

2. The device of claim 1 wherein said transverse bars are nine in number, the upper surface of the plate having five substantially equally spaced transverse bars and the lower surface of the plate having four substantially equally spaced transverse bars in staggered configuration therefrom.

3. A portable vehicle wheel traction device for assisting in transporting a vehicle over a soft or slippery surface, comprising a flat elongated plate and gripping means attached to the upper surface and lower surface of the plate, the gripping means being for providing positive traction between the vehicle wheel and the plate and for embedding the plate through its lower surface in the soft or slippery material, the gripping means comprising a plurality of transverse ribs attached to and extending the entire transverse width of the upper surface of the plate and the lower surface of the plate, said gripping means comprising a transverse triangular prism having an upwardly projecting extension comprising a gripping edge positioned above said prism, the gripping means being constructed of high strength synthetic resin, said gripping means comprising a plurality of said triangular prisms substantially equally spaced on the upper surface of the plate and substantially equally spaced and in staggered configuration on the lower surface of the plate, each upwardly projecting extension of the gripping means defining planes parallel to each other, each plane defining a uniform dihedral angle with respect to the plate, said dihedral angle being about 25° to about 27°.

* * * * *